March 4, 1958 G. BANKO Re. 24,439

PUNCH AND DIE

Original Filed March 12, 1947 3 Sheets-Sheet 1

INVENTOR.
GEORGE BANKO
BY Sanford Schwarmack
ATTORNEY

March 4, 1958

G. BANKO

Re. 24,439

PUNCH AND DIE

Original Filed March 12, 1947

3 Sheets-Sheet 2

INVENTOR.
GEORGE BANKO
BY
Sanford Schnurmacher
ATTORNEY

PUNCH AND DIE

Original Filed March 12, 1947 3 Sheets-Sheet 3

INVENTOR.
GEORGE BANKO
BY Sanford Schwimmacher
ATTORNEY

United States Patent Office

Re. 24,439
Reissued Mar. 4, 1958

24,439

PUNCH AND DIE

George Banko, Cleveland, Ohio

Original No. 2,801,696, dated August 6, 1957, Serial No. 407,961, February 3, 1954, which is a continuation of abandoned application Serial No. 734,167, March 12, 1947. Application for reissue September 27, 1957, Serial No. 686,806

13 Claims. (Cl. 164—118)

Matter enclosed in heavy brackets [ ] appears in the original patent but forms no part of this reissue specification; matter printed in italics indicates the additions made by reissue.

This invention relates to blanking dies and particularly to segmented blanking dies made of tungsten carbide and is a continuation of the application filed by me March 12, 1947, Serial No. 734,167, for Punch and Die, now abandoned.

Conducive to a better understanding of this invention, it may be well to point out that steel blanking dies have long been used in the art of forming blanks having complex outlines. However, the friction and abrasive action between the blank and the die incident to the cutting action causes such a die to require frequent sharpening and as a result it has a relatively short lift span.

The introduction of tungsten carbide to the tool making art immediately suggested its use as a punch and die material due to its physical characteristics of hardness and high resistance to abrasion.

However, it was found that its cost made its use, except in the smallest dies, almost prohibitive. If the die were made in segments with only the cutting edges made of tungsten carbide, the slightest tilting of the segment under the shock of the cutting impact would cause the die to crack and chip due to the extreme brittleness of tungsten carbide. In order to hold the segments firmly in place, it would be necessary to hold them from the back or bottom side for, in the case of a progressive die such as described hereinafter, the top or cutting surface of the die must be kept clear of all obstructions. Again the use of tungsten carbide for this purpose was found impractical due to the fact that it could not be easily bored or threaded due to its hardness. Furthermore, any shearing stress on the threads due to the drawing up of a bolt would be likely to strip the threads due to the brittleness of the material.

The primary object of this invention, therefore, is to provide a progressive die comprising a plurality of interlocking segments of tungsten carbide, the contiguous inner surfaces of which segments, when assembled, form the die shape.

Another object is to provide a blanking and piercing segmented die made of tungsten carbide segments *preferably* mounted on a soft metal base.

A further object is to provide a blanking and piercing segmented progressive die of the type defined, each of whose tungsten carbide segments has a vertical hole therein and a plug member of relatively softer metal in said hole bonded to the respective die segment to be completely inside thereof, the horizontal transverse cross sectional area of said hole and the corresponding outside diameter of said plug being unsymmetrical to vary in the vertical plane of the hole to decrease toward the lower extremity thereof; the plug being bored and threaded through its bottom face to receive securing means carried by the soft metal die base to hold said segment securely in place against upward displacement.

These and other objects of the invention will become apparent from a reading of the following specification and claims, together with the accompanying drawings, in which the same parts are referred to and indicated by the same reference characters and wherein:

Figure 1:
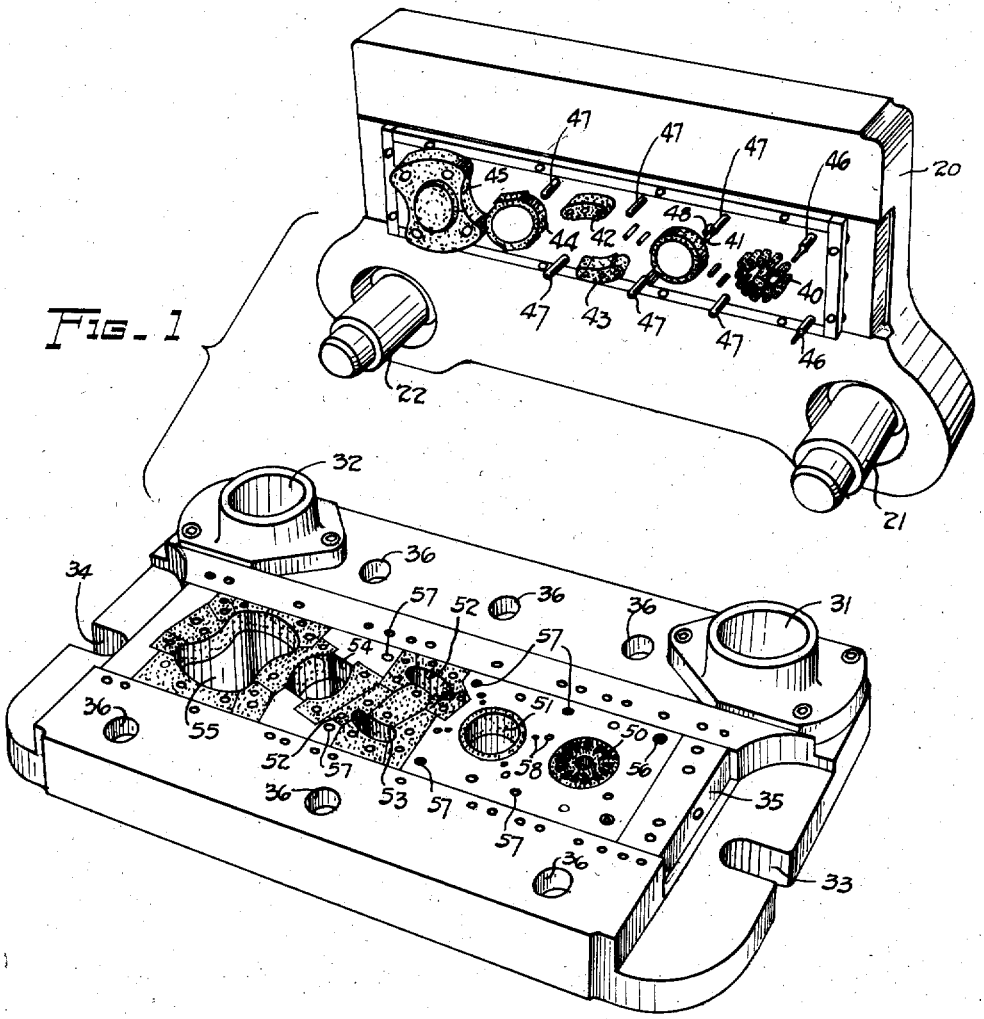
Figure 1 is a perspective view of a die set having a progressive blanking and piercing die, for an electric motor rotor and field piece, composed of individual tungsten segments mounted on the punch plate and base in accordance with this invention.

Referring to the drawings, there is shown a tungsten carbide progressive blanking and piercing die made in accordance with the invention.

The Figure 1 shows a die-set having a punch plate 20 and a die base 30. The die base has slots 33 and 34 and bolt holes 36 through which bolts may be passed to secure the die base to the bolster of a conventional press. The punch plate 20 has an integral shank, not shown on the drawings, which fits the press ram. Reference characters 21 and 22 indicate guide pins which slide in bushings 31 and 32 respectively.

The punch and die arrangement shown in the Figure 1 is intended for use in progressively blanking the individual sheet iron rotor and field plates which are subsequently riveted together to form the laminated rotor and field cores of a small electric motor such as is used in electric vacuum cleaners. It is, of course, to be understood that the progressive segmented die shown here typifies only one of the many forms of dies and can be made in accordance with the invention.

The sheet [iron] *metal* strip *of iron or other material* to be blanked enters the progressive die from the right end and, at the first station, two guide holes are formed therein by the guide hole punch and dies 46 and 56 respectively. The strip is automatically fed through the progressive die by means well known to those skilled in the art of die cutting. The accuracy of the feed is further checked at each station by the guide pins 47 which pass through the guide holes in the metal strip and enter the guide pin holes 57 at each stroke of the press. The rotor is formed by the punches 40 and 41 and the dies 50 and 51. The field piece is formed by the punches 42, 43, 44 and 45 which cooperate with the dies 52, 53, 54 and 55, as shown in the Figure 1. The rivet holes needed in assembling the laminated field core are formed by the punch and dies indicated by reference characters 48 and 58 respectively.

Figure 2:
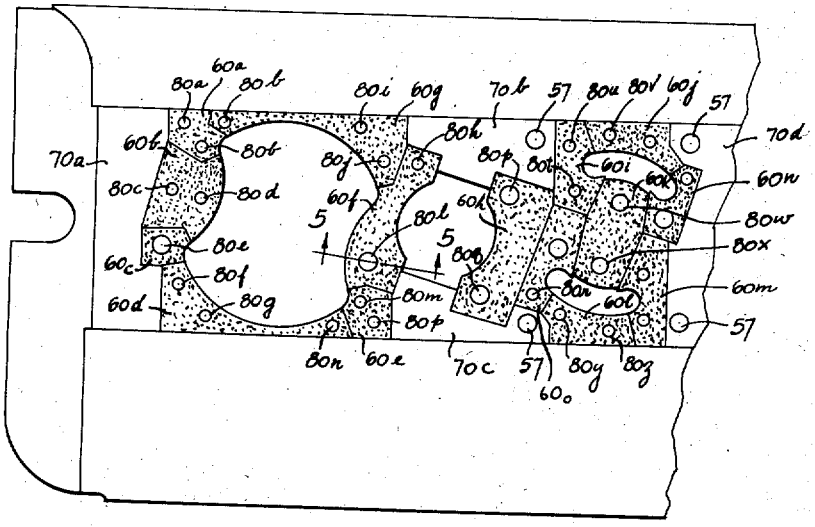
Figure 2 is an enlarged top view of a portion of the die set base and segmented die shown in the Figure 1.
Figure 3:
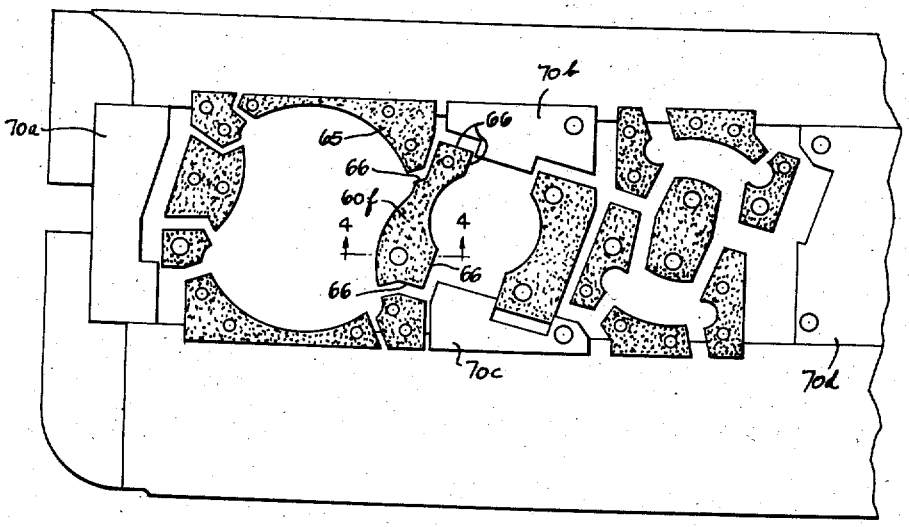
Figure 3 is an exploded top view of a portion of the progressive die showing the individual die segments which are fitted together to form the die illustrated in the Figure 2.
Figure 4:
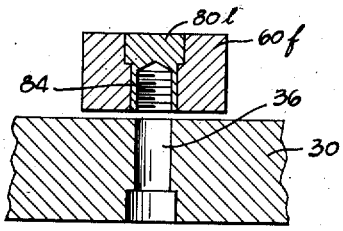
Figure 4 is a vertical sectional view taken substantially along the line and in the direction of the arrows 4—4 of the Figure 3.
Figure 5:
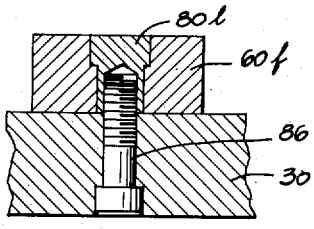
Figure 5 is a vertical sectional view taken substantially along the line and in the direction of the arrows 5—5 of the Figure 2.

The progressive die shown is made of individual segments of tungsten carbide which are shaped to the contours of the blank to be cut. The faces of the non-cutting edges of each segment are ground to fit, match and lock with those of adjacent segments. The segments are positioned in the die channel 35 of the base 30 and together form the die. The individual segments, which are identified by the reference characters 60a to 60o inclusive in the Figures 2 and 3, are bolted to the base 30 by means of bolts 86 which engage the threaded steel plugs 80, as shown in the Figures 4 and 5. The shape of individual segment is calculated to cause it to interlock with adjacent segments so that any tendency to tilt or move sideways is prevented by the inter-action of the assembled segments. *The interlock between adjacent segments is extremely desirable to prevent relative movement of the individual segments inwardly of the die opening where they would obviously be damaged by the co-operating punch.*

TECHNIQUE

Figure 6:
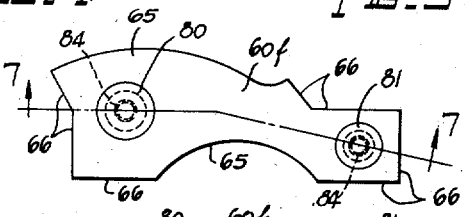
Figure 6 is an enlarged top view of one of the tungsten carbide segments made in accordance with this invention.
Figure 7:
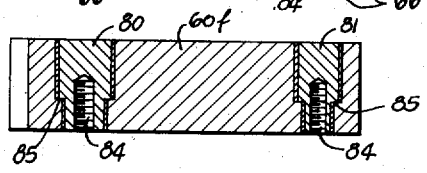
Figure 7 is a cross sectional view of the segment illustrated in the Figure 6, taken along the line and in the direction of the arrows 7—7.
Figure 8:
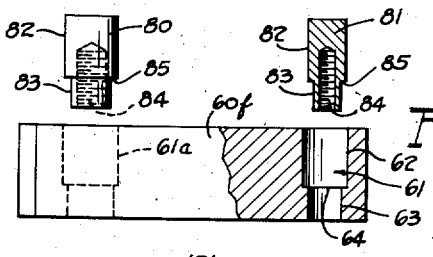
Figure 8 is an exploded view, partly in section, of the segment and plugs.

In making the typical segment 60f, shown in the Figures 6, 7 and 8, a mixture of tungsten carbide particles and metallic cobalt powder is pressed into a briquet containing two cylindrical cores having a horizontal transverse cross sectional area that is unsymmetrical in that it varies in its vertical plane to decrease toward the lower extremity thereof. A typical core shape would be such as to provide the holes 61 and 61a shown in Figure 8. The briquet is roughly shaped to conform to the outline of the finished segment. It is then heated in a hydrogen atmosphere to a temperature high enough for the cobalt to sinter the tungsten carbide particles firmly together.

After cooling, the cores are removed from the tungsten carbide segment, leaving two holes 61 and 61a. Each hole has an upper section 62, a lower section 63 of smaller diameter, and a shoulder 64 at the junction of the two sections. The extreme hardness of the tungsten carbide segments makes it necessary to use inserts or plugs of a softer metal, such as cold rolled steel, that can be more easily drilled and threaded, for the purpose of engaging the anchor bolts 86.

[Cold rolled steel] Plugs 80 and 81 *of cold rolled steel or other suitable material* are fitted into the segment holes 61 and 61a. The shape and dimensions of the plugs correspond to those of their respective holes. Each plug has an upper cylindrical section 82, a lower cylindrical section 83 of smaller diameter, and a shoulder 85 at the junction of the two sections. The holes are usually deformed by the expansion and contraction of the briquet during the sintering process so that only an approximate fit between the hole and plug is possible. The plugs are inserted in the holes 61 and 61a and *are preferably* brazed or otherwise bonded to the tungsten carbide segment. The braze metal fills the space between the plug and hole and takes care of any inequality in fit as shown in the Figure 7. *In some cases a light press fit of the plugs in the holes 61 and 61a is satisfactory.*

The plugs are then ground flush with the upper and lower surfaces of the segment. The cutting edges 65 and the abutting surfaces 66 of the segment are then formed in the conventional manner. *These abutting surfaces 66 are in each case ground to form the interlock either with adjacent segments or with noncutting inserts to be hereinafter described. As best illustrated in Figures 2 and 3 these surfaces 66 take various non-rectilinear shapes to mate with adjacent segments. The shape of each surface 66 is such that the segments when assembled cannot move relative to each other, and, more specifically, the cutting edges 65 thereof are precluded from moving inwardly of the die opening.* Threaded bolt holes 84 are then located and drilled in their proper position in the lower face of each segment plug 80 and 81. The segment is then bolted to the die-set base 30 by means of fillister head socket screws or bolts 86 which engage the threaded plug 80, as shown in the Figure 5. The plug 80, being of soft steel *or other suitable material*, acts as a cushioning clamp which bears against the tungsten carbide segment and absorbs the shock of the stamping impact.

If the bolt hole 84 should be drilled in the wrong position, the plug can be replaced by a new plug, thus preventing the loss of an expensive tungsten carbide segment.

By the use of tungsten carbide die segments made in accordance with this invention, the cost of the die can be kept down by using tungsten carbide segments only in cutting positions. Ordinary soft steel segments 70a, 70b, 70c and 70d are used to fill in between the tungsten carbide segments, as shown in the Figure 1. *These soft steel segments interlock as best shown in Figure 2 with certain of the die segments and act in a manner similar to abutting die surfaces 66 in preventing relative movement of the assembled die.* Circular tungsten carbide dies such as those designated by reference characters 50, 51 and 58 are inserted into the steel segment 70d by press fits in the manner well known to those skilled in the art of die making. The steel segments, being relatively soft, can be directly drilled and tapped in the conventional manner.

Modified ways of securing the segments to a die set are indicated in Figures 9, 10, 11, 12 and 13.

Figure 9:
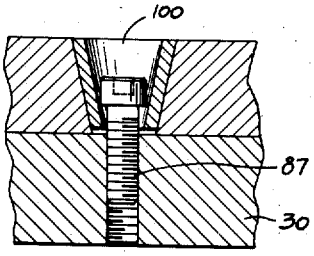
Figure 9 illustrates a modified form of the segment in which the plug is frusto-conical in shape with a central tapered hole therethrough.

In the Figure 9, a frusto-conical hole is formed in the segment and a similarly shaped soft steel plug 100, having a tapered hole therethrough, is brazed into the hole of the tungsten carbide segment. The fillister head bolt 87 is inserted in the plug hole with its threaded end engaged with a threaded hole in the base 30. The bolt is then secured down until its head engages the tapered hole of the plug and draws the segment into firm contact with the base 30.

Figure 10:
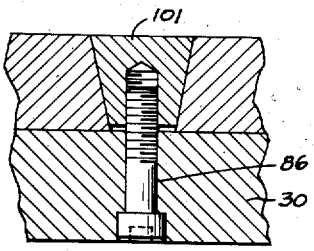
Figure 10 shows a modified form of the segment in which the plug is frusto-conical in shape with a threaded blind hole therein.

In the Figure 10, a solid frusto-conical soft steel plug 101 is used. The plug is drilled and threaded to receive the threaded end of a bolt 86 which passes through a hole in the base 30, as shown.

Figure 11:
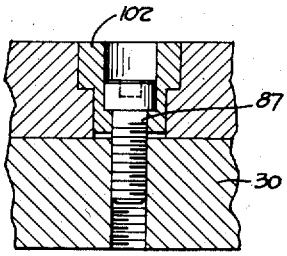
Figure 11 illustrates a modified form of a segment having a square plug with a counter-bored hole therethrough for engaging the head of a fillister head bolt.

Figure 11 shows a modified form of holding means in which the plug 102 has a square upper section and a cylindrical lower section. The plug also has a counterbored central hole in which the fillister head socket bolt 87 is seated. The threaded end of the bolt engages a threaded hole in the base 30.

Figure 12:
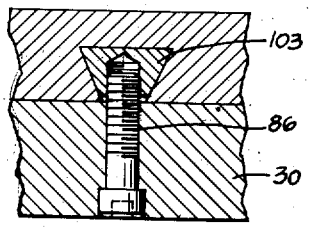
Figure 12 shows a modified form of the segment having an insert that is wedge shaped in cross section.

In the Figure 12, a slot or keyway that is wedge shaped in cross section is formed in the segment and an insert or key 103 having a corresponding wedge shaped cross section is slid into the keyway. Threaded anchor holes for receiving the bolts 86 are then located in their proper places in the soft steel insert as shown.

Figure 13:
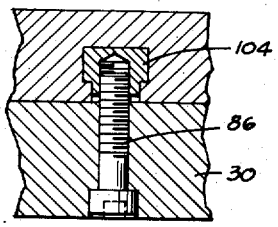
Figure 13 illustrates a modified form of the segment having an insert that is T-shaped in cross section.

In the Figure 13, still another modified form of segment is shown in which the key or insert is T-shaped in cross section.

The last two types of segments shown in the Figures 12 and 13 are intended for use where the upper surface of the die is to be unbroken.

Tungsten carbide punches can also be held in place on the punch plate of a die set by the use of these steel plugs or inserts, as shown in the Figure 1, in which the punches designated by reference characters 42, 43, 44 and 45 are so held.

A die in accordance with this invention can be sharpened in the usual manner, since the tops of the plugs are ground down along the tungsten carbide die surfaces. The number, location and size of the plugs is determined by the size and shape of the individual segment.

*It should be quite obvious to one skilled in the art that the retention of the carbide segments on the die base may be accomplished by suitable threaded bolts inter-engaging tapped holes in the segments when upwardly directed from the base. In the alternative, such retention on the base may be obtained by inserting the bolts through suitable holes in the segments for inter-engaging tapped openings in the base when inserted downwardly through the segment into the base. In other words, the use of the plug inserts is not considered critical to the retention of the segments on the base against vertical movement relative thereto. The use of soft metal plugs in effect represents the preferred form of the invention but not the exclusive form thereof.*

It will now be clear that there is provided a tungsten carbide die segment that can be securely anchored in place on a diet set to form a die that will have a useful life ten to twenty times that of a conventional steel die, in addition to the fact that the number of impressions per sharpening is proportionately greater. While the invention has been disclosed in its preferred form, together with several modifications thereof; it is to be understood that the specific embodiments thereof as described and illustrated herein are not to be considered in a limiting sense, as there may be other forms or modifications of the invention which should also be construed to come within the scope of the appended claims.

I claim:

1. In a punch and die set, a punch plate, a base having a channel, a die holder of relatively soft metal having outer surfaces fitted in said channel, a die comprising a plurality of interlocking segments of relatively hard metal of tungsten carbide, the outer surfaces of which match inner surfaces of said die holder and the contiguous inner surfaces of which die segments, when assembled, form the die shape, each of said tungsten carbide die segments having a vertical hole therein, a plug member of relatively softer metal in each of said holes and bonded to the respective die segment to be completely inside thereof, the horizontal transverse cross sectional area of each hole, and the corresponding outside diameter of the plug, being unsymmetrical to vary in the vertical plane of the hole to decrease toward the lower extremities thereof, securing means located wholly within the confines of said plugs, securing means carried by said base, said two securing means in cooperation with the unsymmetrical plugs in said unsymmetrical holes, inherently increasingly resisting upward displacement of said die segments upon upward withdrawal of said punch from said die, and, in cooperation with said die holder and the confines of said channel, securing said segments to said base and to form said die and prevent relative movement among said interlocking segments.

2. In a punch and die set, a punch plate, a base having a channel, a die holder of relatively soft metal having outer surfaces fitted in said channel, a die comprising a plurality of interlocking die segments of relatively hard metal of tungsten carbide, the outer surfaces of which match inner surfaces of said die holder and the contiguous inner surfaces of which segments, when assembled, form the die shape, each of said tungsten carbide die segments having a counter-bored hole therein, an unsymmetrical plug member of relatively softer metal in each of said holes and bonded to the respective die segment to be completely inside thereof, securing means located wholly within the confines of said plugs, the horizontal transverse cross sectional area of each counterbored hole, and the corresponding outside diameter of the plug varying in the vertical plane of the holes to decrease toward the lower extremities thereof, securing means carried by said base, said two securing means, in cooperation with the plugs in the counterbored holes, inherently increasingly resisting upward displacement of said die segments upon upward withdrawal of said punch from said die, and in cooperation with said die holder and the confines of the channel in said base, securing said die segments to said base and forming said die and preventing relative movement among said interlocking die segments.

3. In a punch and die set, a punch plate, a base having a channel, a hollow die holder of relatively soft metal having its outer surfaces fitted in said channel, a die comprising a plurality of interlocking segments of relatively hard metal of tungsten carbide, the outer surfaces of which match the inner surfaces of said die holder, the contiguous inner surfaces of which segments, when assembled, form the die shape, each of said tungsten carbide segments having a vertical tapered hole therein, a plug member of relatively softer metal in each of said holes and bonded to the respective die segment to be completely inside thereof, the horizontal transverse cross sectional area of each tapered hole, and the corresponding outside diameter of the plug, tapering in the vertical plane of the hole to decrease toward the lower extremities thereof, securing means located wholly within the confines of said plugs, securing means carried by said base, said two securing means in cooperation with the tapered plugs in the tapered holes inherently increasingly resisting upward displacement of said die segments upon upward withdrawal of said punch from said die, and in cooperation with said die holder and the confines of said channel, securing said segments to said base and to form said die and prevent relative movement among said interlocking die segments.

*4. A punch and die set comprising a die base, a die including a plurality of interlocking hard metal segments, the contiguous inner surfaces of said die segments, when assembled, forming the die shape, means engaging the outer surfaces of said die segments to prevent lateral movement of said segments relative to the die base, means to secure each segment to the die base to prevent movement of said segments relatively normal to the die base, the interlocking engagement between abutting surfaces of each said die segment being of a non-rectilinear character to prevent movement of said segments relative to each other, and a punch plate carrying punches to cooperate with the die formed by the hard metal segments so secured to the die base.*

*5. The invention according to claim 4 in which said hard metal segments are formed of tungsten carbide.*

*6. A punch and die set comprising a die base, a die including a plurality of hard metal segments, the contiguous inner surfaces of said die segments, when assembled, forming the die shape, the abutting surfaces of said die segments being non-rectilinear in character and fitting with each other in interlocking relationship to prevent relative movement of adjacent segments, means engaging the outer surfaces of said die segments to prevent lateral movement of said segments relative to the die base, means to secure each segment to the die base to prevent movement of said segments relatively normal to the die base, and a punch plate carrying punches to cooperate with the die formed by the segments so secured to the die base.*

*7. The invention according to claim 6 in which the hard metal segments are formed of tungsten carbide.*

*8. A punch and die set comprising a die base, a die including a plurality of hard metal segments, the contiguous inner surfaces of said die segments, when assembled, forming the die shape, the abutting surfaces of said die segments being non-rectilinear in character and fitting with each other in interlocking relationship to prevent relative movement of adjacent segments, means engaging the outer surfaces of said die segments to prevent lateral movement of said segments relative to the die base, bolt means to secure each segment to the base to prevent movement of said segments relatively normal to the die base, and a punch plate carrying punches to cooperate with the die formed by the segments so secured to the die base.*

*9. The invention according to claim 8 in which said hard metal segments are formed of tungsten carbide,*

*10. A punch and die set comprising a die base including a channel in the face thereof, a die including a plurality of hard metal segments, the contiguous inner surfaces of said die segments, when assembled, forming the die shape, the abutting surfaces of said die segments being non-rectilinear in character and fitting with each other in interlocking relationship to prevent relative movement of adjacent segments, means engaging the outer surfaces of said segments to confine the segments in the channel of the die base against movement laterally of the die base, means to secure each segment to the die base to prevent movement of said segments relatively normal to the die base, and a punch plate carrying punches to cooperate with the die formed by the segments so secured to the base.*

*11. The invention according to claim 10 in which said hard metal segments are formed of tungsten carbide.*

*12. A punch and die set comprising a die base including a channel in the face thereof, a die including a plurality of hard metal segments, the contiguous inner surfaces of said die segments, when assembled, forming the die shape, the abutting surfaces of said die segments being non-rectilinear in character and fitting with each other in interlocking relationship to prevent relative movement of adjacent segments, means located in the channel of the die base to engage the outer surfaces of the segments to confine the segments in the channel against movement laterally of the die base, bolt means to secure each segment to the die base to prevent movement of said segments relatively normal to the die base, and a punch plate carrying punches to cooperate with the die formed by the segments so secured to the base.*

*13. The invention according to claim 12 in which said hard metal segments are formed of tungsten carbide.*

References Cited in the file of this patent or the original patent

| | | |
|---|---|---|
| Re. 22,091 | Rippen | May 5, 1942 |
| 54,539 | Hastings | May 8, 1866 |
| 109,249 | Rice | Nov. 15, 1870 |
| 1,070,887 | Hartog | Aug. 19, 1913 |
| 1,919,552 | Hasselquist | July 25, 1933 |
| 1,922,110 | Schultz | Aug. 15, 1933 |
| 2,061,403 | Janiszewski | Nov. 17, 1936 |
| 2,163,229 | Kuebel | June 20, 1939 |
| 2,378,562 | Lahr | June 19, 1945 |
| 2,407,501 | Kraus | Sept. 10, 1946 |